March 21, 1933.    A. O. AUSTIN    1,902,009
CONDUCTOR ATTACHMENT
Filed March 29, 1929    3 Sheets-Sheet 1
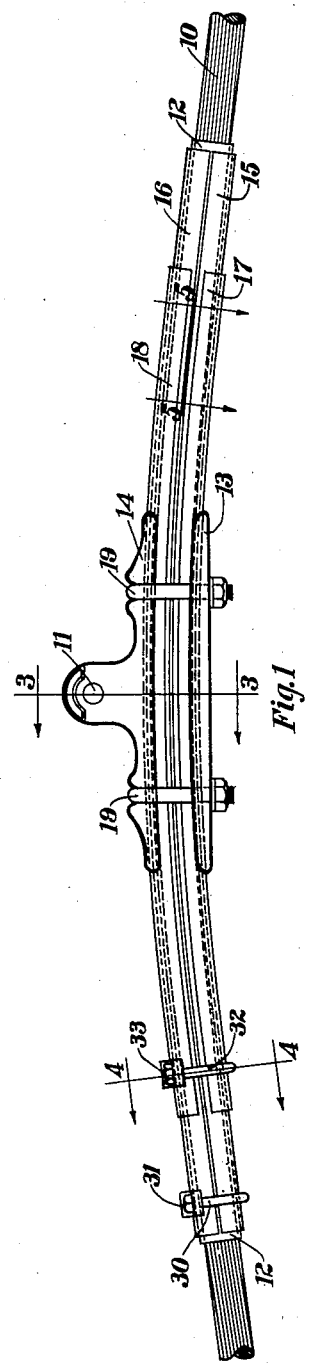
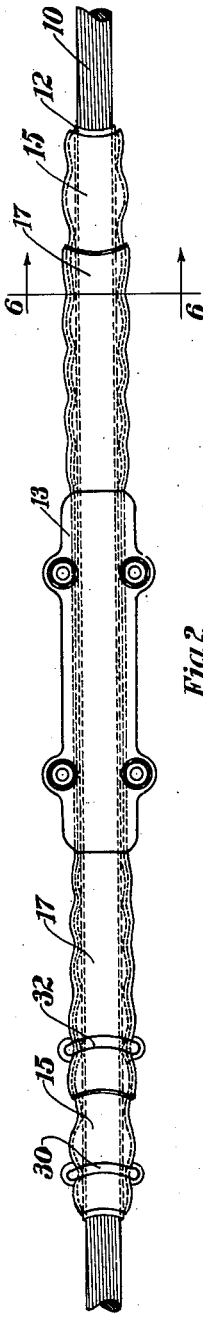
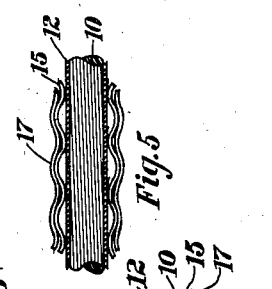
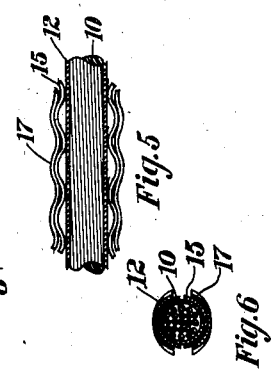
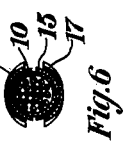
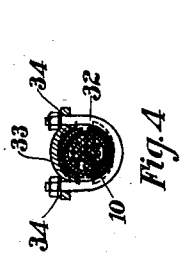
INVENTOR
Arthur O. Austin.
BY
ATTORNEY

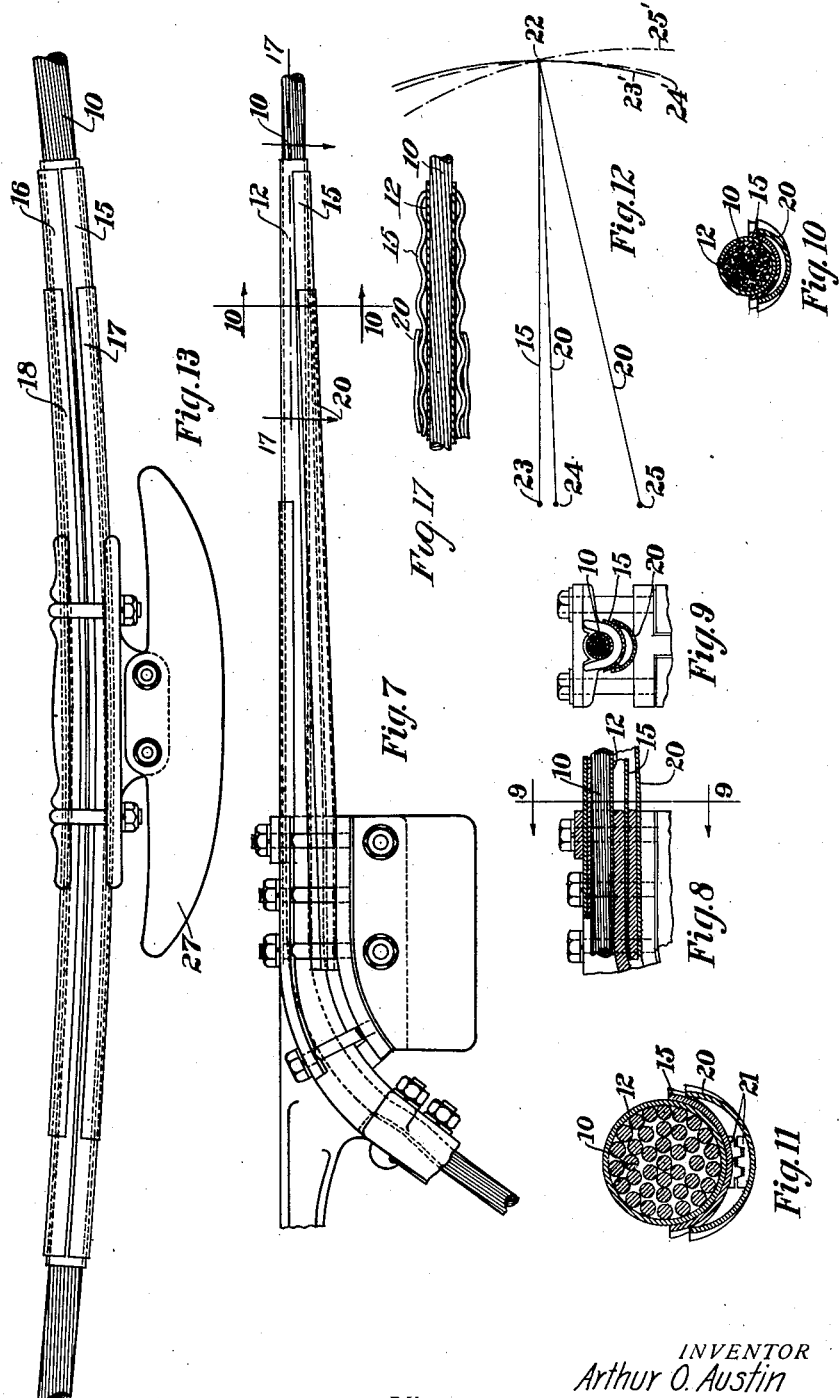

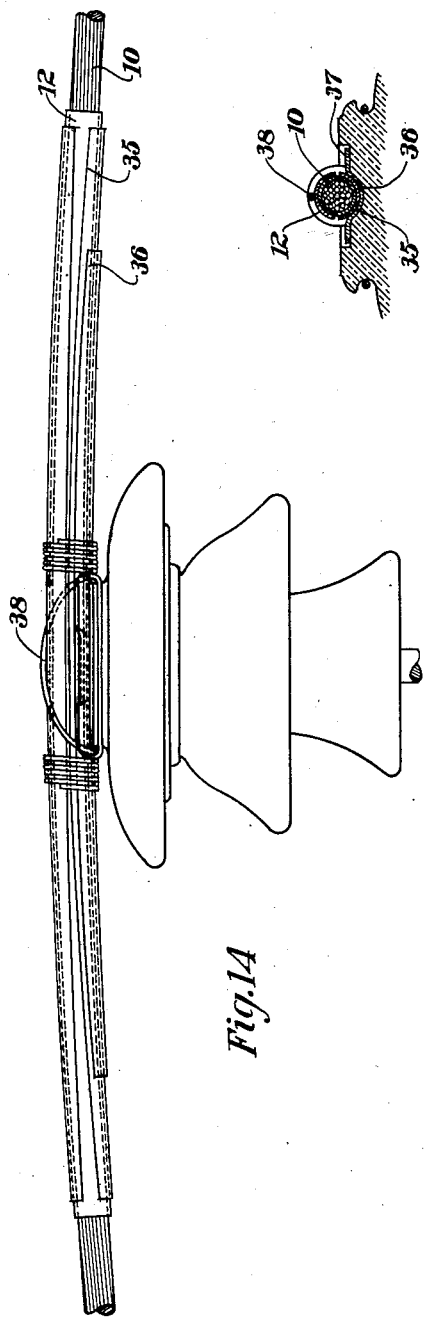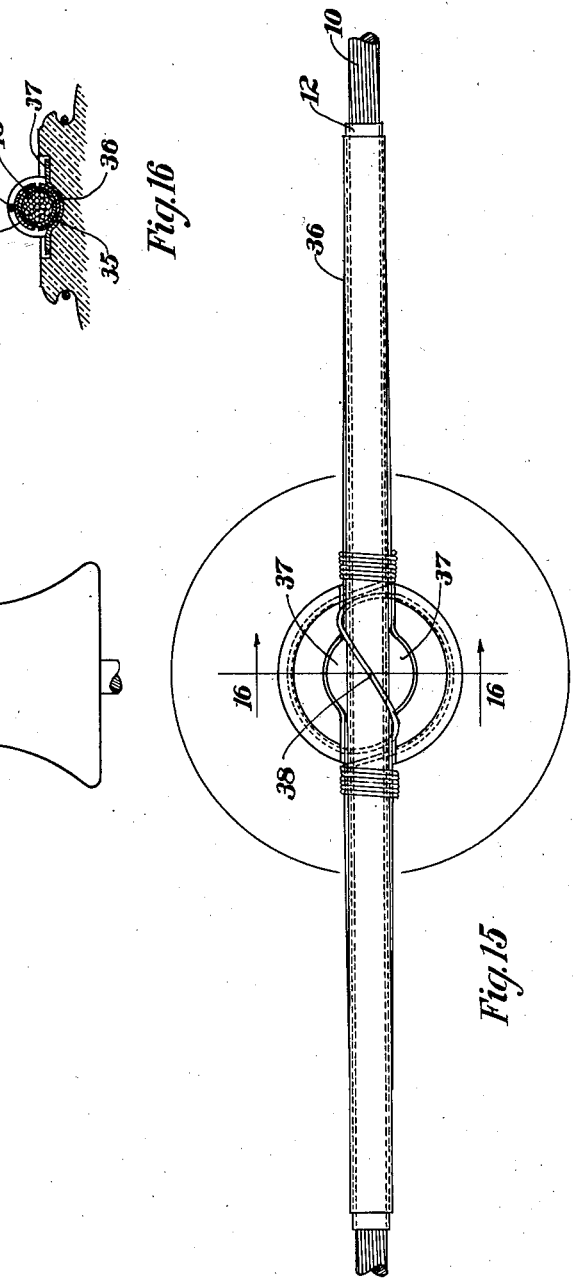

Patented Mar. 21, 1933

1,902,009

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

CONDUCTOR ATTACHMENT

Application filed March 29, 1929. Serial No. 351,056.

This invention relates to devices for engaging electrical conductors and other strands or cables, and has for one of its objects the provision of an attachment for damping vibrations in the conductor or strand.

Another object of the invention is to provide a holding member or support which will gradually take up the load on the conductor in order to avoid a fixed stop or shoulder about which the conductor will vibrate.

A further object is to provide a vibration damper and support for a conductor which shall be of improved construction and operation.

Other objects and advantages will appear from the following description.

The invention is exemplified in the combination and arrangement of parts shown in the accompanying drawings and described in the following specification, and it is more particularly pointed out in the appended claims.

In the drawings:

Fig. 1 is an elevation of a conductor support embodying one form of the present invention.

Fig. 2 is a bottom plan view of the device shown in Fig. 1.

Fig. 3 is a section on line 3—3 of Fig. 1.
Fig. 4 is a section on line 4—4 of Fig. 1.
Fig. 5 is a section on line 5—5 of Fig. 1.
Fig. 6 is a section on line 6—6 of Fig. 2.
Fig. 7 is an elevation of the invention applied to a dead-end clamp.

Fig. 8 is a fragmentary vertical section of a portion of the clamping mechanism shown in Fig. 7.

Fig. 9 is a section on line 9—9 of Fig. 8.
Fig. 10 is a section on line 10—10 of Fig. 7.
Fig. 11 is a section similar to Fig. 10 of a somewhat modified form of the invention and on a larger scale than Fig. 10.

Fig. 12 is a diagram illustrating the mode of operation of one feature of the invention.

Fig. 13 is an elevation of a different form of the invention.

Fig. 14 is an elevation of another modification of the invention.

Fig. 15 is a top plan view of the form of the invention shown in Fig. 14.

Fig. 16 is a section on line 16—16 of Fig. 15.
Fig. 17 is a fragmentary horizontal section substantially on line 17—17 of Fig. 7.

In the use of high voltage conductors for transmission lines, it is customary to support the conductors on pin type or suspension insulators carried by poles, towers or other supporting structures. The cost of supports is one of the large items of expense in building a transmission line, hence, it is desirable to reduce the number of supports as much as possible. In order to reduce the number of supports, it is necessary to have high mechanical tension in the conductor. With the increase in tension in the conductor, there is a tendency for the conductor to vibrate in wind, either under normal operating conditions or where there is sleet on the conductor. It is difficult to control this vibration, as there are several factors tending to set up the vibrations or oscillations in the conductor. Vibration of the conductor tends to cause crystallization, particularly at the points of support.

It is evident that if the amplitude of motion due to vibration can be limited at the point of support, it may be possible to reduce or eliminate crystallization or damage to the conductor so that the life of the conductor may be materially increased or more severe operating conditions met for the same degree of reliability.

In order to secure the desired result, a support has been devised which overcomes the conditions tending to destroy the conductor, first, by absorbing some of the energy of vibration or oscillation, and, secondly, by regulating the amplitude of movement of the conductor adjacent the point of support. The apparatus employed is cheaply made, and readily installed and may be applied not only to high tension power conductors, but to any conductor or other cable where vibration is likely to cause damage. In place of using the devices of the invention as supports, they may be attached to conductors at various points thereon with weights attached thereto to provide inertia and enable them to act as energy absorbing means for damping out vibrations.

The construction has many applications other than to conductors and may be applied to railbonds or any tension member where it is desired to dampen out vibrations.

In the form of the invention shown in Figs. 1 to 6 inclusive, the device is applied to a high voltage conductor strand 10 with a fitting or clevis 11 suitable for attachment to a suspension insulator string. Where steel cored or steel reinforced aluminum conductors are used, it is usually advisable to protect the conductor by an aluminum armor piece 12. This may be of various forms such as a pair of complementary members U shaped in cross section or a spiral ribbon. If a U shaped member is used, it may be necessary to slot the sides of the piece in order to permit it to bend readily in the vertical plane of the conductor. It is evident that if the conductor were clamped directly by the main clamping members 13 and 14 there might be a tendency to localize the stress at the point of entry of the conductor 10 into the clamping pieces 13 and 14. In general practice it has heretofore been customary to provide long seat pieces similar to 13 and 14 but with curved ends so that the grip would be picked up gradually. It is, however, evident that clamping members formed in this manner have to be made sufficiently strong to withstand the mechanical stress without deforming. This makes it necessary to use a comparatively large mass. In addition, where a conductor enters a gradualy tapered open seat, a pounding action may result between the conductor and seat which will readily destroy soft material such as aluminum or copper of which most conductors are composed. In the present device it is possible to so grip the conductor by the resilient sleeves that while the stress is picked up gradually, there is no looseness which will permit a pounding action and damage the conductor. In order to secure this result, resilient clamps comprising spring bars 15 and 16 are provided having U-shaped sections conforming to the conductor 10 or to the protecting sleeve 12. In order to increase the rigidity of the clamps 15 and 16 near the main grip pieces 13 and 14, the resilient clamps 15 and 16 may be reinforced by clamps 17 and 18 of the same general construction as 15 and 16. While it is evident that by grading the stiffness of the pieces 15 and 16 it is possible to take up the load of the conductor 10 gradually, thus eliminating any "hard spot" which tends to localize the oscillation and damage the conductor, nevertheless, it is usualy advisable to use several clamping members graded in length as with this latter construction it is possible to cause a dissipation of energy by relative movement of the clamping members on one another. This absorption of energy is accomplished by the slipping of adjacent clamping sections upon each other as between 17 on 15 and 18 on 16 in the manner of leaves in a spring. The amount of energy dissipated may be increased in several ways which fall within the scope of the invention.

Where the contact between the seat pieces is well up the sides so that the contacting portions form a steep angle, a slight amount of vertical pressure between the two pieces will increase the bearing pressure between the contacting parts. Since the dissipation of energy depends upon the frictional force times the distance of movement, multiplication of this force several times will materially increase the dissipation of energy. It, of course, is also possible to further increase the dissipation of energy by facing the bearing surfaces with material which has a high coefficient of friction or in which the friction may be increased by so arranging the bearing surface that it makes an angle with the normal direction of the force tending to hold the two parts in contact.

In obtaining the maximum dissipation of energy, several factors may be utilized to advantage. These factors are the coefficient of friction between bearing surfaces, the pressure between the bearing surfaces, and the movement between the bearing surfaces. Since the dissipation of energy is proportional to the product of these three factors, it is evident that any or all of them may be increased to increase the dissipation of energy which might otherwise be negligible. The present invention makes it possible to control the several factors to a very considerable extent and still produce a device which is suitable for application to very high voltage lines as well as other installations. The parts may be so arranged that there are no large projecting surfaces which will tend to cause electrical discharges and increase flash-over voltage, thus avoiding conditions which preclude many other types of construction.

In the form of the invention shown in Figs. 1 to 5 inclusive, the edges of the resilient members 15, 16, 17 and 18 are undulated, fluted or corrugated. This is more clearly shown in the plan view of Fig. 2 in which the corrugations appear as waves at the sides of the clamping members. This corrugation or waving of the open edges of the U shaped members permits them to have the desired resiliency, as the U shaped section might otherwise be too stiff or tend to cause bending in one place so that the members would be damaged by crystallization. This general form permits of the formation of very light spring members which at the same time will have the necessary rigidity. It is evident that the rigidity of the members may be materially changed to meet the various conditions by increasing the depth or frequency of the waves or corrugations. While these corrugations may extend entirely around the U shaped or resilient members, they can usually be tapered out near the center, the open edges having the greatest depth of corrugation. This arrangement affords a large bearing surface for the conductor, but, at the same time, makes it possible to provide a graded rigidity or resiliency. In general, the resilient members need have few if any corrugations until after they leave the grip members 13 and 14. The main grip members which transfer the load to the insulator may be held together by U bolts 19. By referring to Fig. 5, it will be seen that the resilient members 15 and 16 do not necessarily conform closely to each other, but preferably bear at spaced points so there may be some longitudinal movement between the two parts. This longitudinal movement permits of a dissipation of energy which tends to dampen out the vibration. It is evident that bearing may take place at one or several points, depending upon the conditions desired or upon loading.

The relative movement between the parts may be increased by spacing the resilient members some distance apart under the main grip pieces, allowing them to come together some distance out from the point of support as shown in Figs. 7, 8 and 9. In this case, the member 15 is adjacent to the cable 10 with its protecting sleeve 12, as in Figs. 1 and 2. In place of the resilient member 17, however, a resilient member 20 spaced some distance from the member 15 under the main clamp is used. This member comes into contact with the member 15 near the end of member 20. It is evident that under this condition a given vertical movement in the conductor 10 will cause a greater longitudinal slip at the point of contact between the members 20 and 15 than where these two members are placed adjacent to each other throughout their length. In order to further increase the frictional force and dissipation of energy, bearing may take place on the sides of the U shaped members, a section of which is shown in Fig. 10, or friction plates 21 forming a part of or attached to the two resilient members may be used as shown in Fig. 11.

The reason for spacing the resilient members some distance apart at the point of gripping is more clearly shown by reference to Fig. 12. In Fig. 12, points 23 and 24 represent the centers of vibration of the two pieces where they are held closely together. It will be seen that a movement of the outer ends of these members in a vertical direction produces a movement of member 15 about a center 23 and of the member 20 about a center 24. Since, however, these centers are very close together, the relative longitudinal movement at the point 22 would be very small. If, however, the center of rotation of member 20 be moved from 24 to 25, it will be seen that the longitudinal movement at the point 22 for a given vertical movement will be increased very greatly, as the longitudinal movement will be between the arcs 23' and 25' in place of between 23' and 24'. If the other factors remain the same, that is, the pressure and coefficient of friction, the dissipation of energy for a given vertical movement in the conductor will be increased in proportion to the increased travel or divergence of the arcs.

It is realized that where resilient or spring members are used the path of movement may not be an exact arc, but the principle is illustrated by Fig. 12. It is readily seen that where the various factors are combined, what might otherwise be a negligible energy absorbing means, tending to dampen out oscillations, may be materially increased. This makes it possible to use the device not only as a combined vibration dampener and support, but also as a vibration dampener apart from the support.

Fig. 13 shows an arrangement of the invention as a vibration dampener separate from the line support. In this form it is preferable to make the resiliency of the members such that a slight oscillation in the conductor will tend to cause a relative movement between the energy absorbing parts, the necessary reactive force being provided in the mass of the clamp 27. It is evident that in order to absorb energy the parts cannot be too rigid or else the whole device together with the weight 27 may vibrate with the conductor without producing relative movement.

It is evident that in any of the above applications the upper resilient members may be dispensed with if desired and may be either longer or shorter than the lower members. In order to increase the dissipation of energy or prevent looseness, the resilient members may be clamped to the conductor by any suitable means as by a U-bolt 30 and a seat piece 31 and a U-bolt 32 and clamping piece 33 may be utilized to hold the complementary resilient members together. Where yielding resilient clamps are used for this purpose, tightness may be secured to take up any wear. In some cases a spring lockwasher 34 is sufficient. In other cases, it may be desirable to replace the lock washer by a spring member having more latitude or by a bolt or other clamping device which will have the necessary resiliency.

In Figs. 14, 15 and 16 the invention is illustrated as applied to a pin type insulator used for support. In this case, the upper half of the resilient members may be eliminated if desired, and the conductor 10 may be covered with an armor ribbon or liner 12. The resilient members 35 and 36 may be made up as shown previously. These members are provided with lateral projections or deformations 37. These projections prevent the resilient supporting members from rotating on the insulator and keep the open side upward at all times. If desired, these projections 37 may be made to interlock with recesses in the insulator which will hold the clamp in longitudinal position as well as from overturning. The whole combination may be fastened to the insulator by any of the usual methods such as a tie wire or a clamp 38. A device of this kind makes it possible to use very light conductors with comparatively long spans which are highly desirable for lines serving rural districts in which the demand for power is small.

The resiliency of the channel shaped spring clamp members may be graded along the conductor in various ways, as, for instance, by varying the undulations in the marginal portion of the springs or by varying the thickness of the spring member or by tapering the edge as shown in Fig. 14. This increases the resiliency of the spring near the end so as to prevent the formation of a node in the cable adjacent the end of the spring and so as to take up gradually the load on the cable.

I claim:

1. The combination with a strand, of a pair of channel shaped spring members nested together with said strand disposed in the channel on the inner one of said members, and means for holding said spring members against transverse movement at one portion thereof to cause said members to be flexed when said strand is vibrated.

2. The combination with a strand, of a pair of nested channel shaped spring members having said strand disposed in the channel of the inner member, and means for holding said spring member against transverse movement at one portion thereof, said spring members having the edges thereof undulated and engaging each other at spaced points while portions of said edges between said engaging points are spaced apart.

3. The combination with a strand, of a pair of channel shaped leaf spring members nested together beneath said strand, with said strand disposed in the channel of the inner spring member, a liner interposed between the innermost spring member and strand, means for clamping said spring member to said strand at a point spaced from the ends of said spring members, said spring members being spaced apart at the point clamped to said strand, and frictional means interposed between said spring members at a point spaced from the clamped portions thereof for absorbing energy of transverse vibration of said strand.

4. The combination with a strand, of a spring member extending along said strand, a frictional member secured to said strand adjacent one end of said spring member, said spring member having diverging walls frictionally engaging said frictional member to damp out vibration of said strand, the frictional engagement between said spring member and friction member being restricted to a small portion of said spring member adjacent the end thereof.

5. The combination with a strand of a support therefor comprising a channel shaped spring in which the strand is disposed, the upper side of said spring being open, the spring having a portion thereof clamped to the strand and held against movement, and having a free end portion extending along the strand for gradually taking up the load of the strand, said extending portion being graded in resiliency, and friction means for damping vibrations of said extending portion.

6. The combination with a strand, of an open channel spring having a portion thereof fixed in spaced relation to said strand and extending from said fixed portion along said strand at an oblique angle thereto, and having frictional engagement with said strand at a point spaced from said fixed portion, said spring having the edges thereof weakened as compared with the bottom of the channel to facilitate flexing of said spring.

In testimony whereof I have signed my name to this specification this 27th day of March A. D. 1929.

ARTHUR O. AUSTIN.